United States Patent [19]

Burleson

[11] 4,128,794

[45] Dec. 5, 1978

[54] INTERFEROMETRIC CORRECTION SYSTEM FOR A NUMERICALLY CONTROLLED MACHINE

[75] Inventor: Robert R. Burleson, Clinton, Tenn.

[73] Assignee: The United States of America as represented by the United States Department of Energy, Washington, D.C.

[21] Appl. No.: 841,087

[22] Filed: Oct. 11, 1977

[51] Int. Cl.$^2$ ............................................. G05B 19/28
[52] U.S. Cl. ..................................... 318/603; 318/640; 250/568
[58] Field of Search ............... 318/600, 601, 602, 603, 318/640; 250/568

[56] References Cited

U.S. PATENT DOCUMENTS

| 3,708,657 | 1/1973 | Kelling ............................ 318/640 X |
| 3,786,332 | 1/1974 | Hepner et al. ..................... 318/640 X |
| 3,889,164 | 6/1975 | Nishizawa et al. ................. 318/640 |

Primary Examiner—B. Dobeck

Attorney, Agent, or Firm—Dean E. Carlson; Stephen D. Hamel; David E. Breeden

[57] ABSTRACT

An interferometric correction system for a numerically controlled machine is provided to improve the positioning accuracy of a machine tool, for example, for a high-precision numerically controlled machine. A laser interferometer feedback system is used to monitor the positioning of the machine tool which is being moved by command pulses to a positioning system to position the tool. The correction system compares the commanded position as indicated by a command pulse train applied to the positioning system with the actual position of the tool as monitored by the laser interferometer. If the tool position lags the commanded position by a preselected error, additional pulses are added to the pulse train applied to the positioning system to advance the tool closer to the commanded position, thereby reducing the lag error. If the actual tool position is leading in comparison to the commanded position, pulses are deleted from the pulse train where the advance error exceeds the preselected error magnitude to correct the position error of the tool relative to the commanded position.

4 Claims, 2 Drawing Figures

INTERFEROMETRIC CORRECTION SYSTEM FOR A NUMERICALLY CONTROLLED MACHINE

This invention was made during the course of, or under, a contract with the U.S. Energy Research and Development Administration.

BACKGROUND OF THE INVENTION

This invention relates generally to numerically controlled machines and more specifically relates to precision positioning systems for numerically controlled machines.

In a conventional high-precision numerically controlled machine, a tool is moved only when a laser interferometer or other position feedback system indicates that an error exists between the actual location of the tool and a desired location as designated by a part program. This method of transferring a tool from one location to another is known as "error positioning" because an error must exist before the tool can be moved. This scheme has a major disadvantage in that there is an undesirably large lag time between the time a part program indicates that a tool should be in a new location and the time that the tool is actually moved to that location. This disadvantage reduces the control capabilities of an NC system in terms of high speed feedback precision.

In the art of diamond machining of optical components such as large metal reflective mirrors which require a contour accuracy of 10.0 microinches, it is not considered to be a cost effective approach to make the mechanical positioning components in the various axis drive means to obtain ultra precise positioning of the diamond cutting tool for this degree of contour accuracy. If "stepping motor-like" drives were utilized and the reduction unit, the lead screw, and the nut for each axis were dimensionally perfect, the tool would be positioned exactly as commanded except for the very small lag introduced by the finite compliance of the drive shafting, gearing and the finite mass of the slide. Since this degree of ultra-high precision machining is impossible from a cost standpoint and from a practical standpoint as well, due to wear of the various machine parts over the life of a cutting machine, laser interferometer feedback is used to maintain cutting tool position accuracy.

SUMMARY OF THE INVENTION

In order to reduce the undesirably large lag time between the time a part program indicates that a tool should be at a new location and the time that the tool actually moves to that location using the conventional "error positioning" method, this invention provides a system in which the lag time is substantially reduced by using the laser interferometer feedback system to alter the command pulse train from the numerical controller to the positioning drive means by adding or deleting individual command pulses to correct for errors in positioning. In this arrangement the command pulses are applied directly to the positioning system, thereby reducing the lag time.

In view of the above it is an object of this invention to provide an interferometric correction system for a numerically controlled positioning system which does not require an undesirably long lag time between command pulse generation and the corresponding commanded movement.

It is another object of this invention to provide a positioning system as set forth in the above object wherein the command pulses to a drive means for positioning a tool, for example, are suppled directly to the drive means while simultaneously compared with identical increment pulses from an interferometer feedback system to correct the tool position by adding or deleting pulses in the pulse train when the positioning error exceeds a predetermined selectable limit.

Other objects and many of the attendant advantages of the present invention will be obvious to those skilled in the art from the following detailed description taken in conjunction with the drawings.

DETAILED DESCRIPTION

Figure 1:
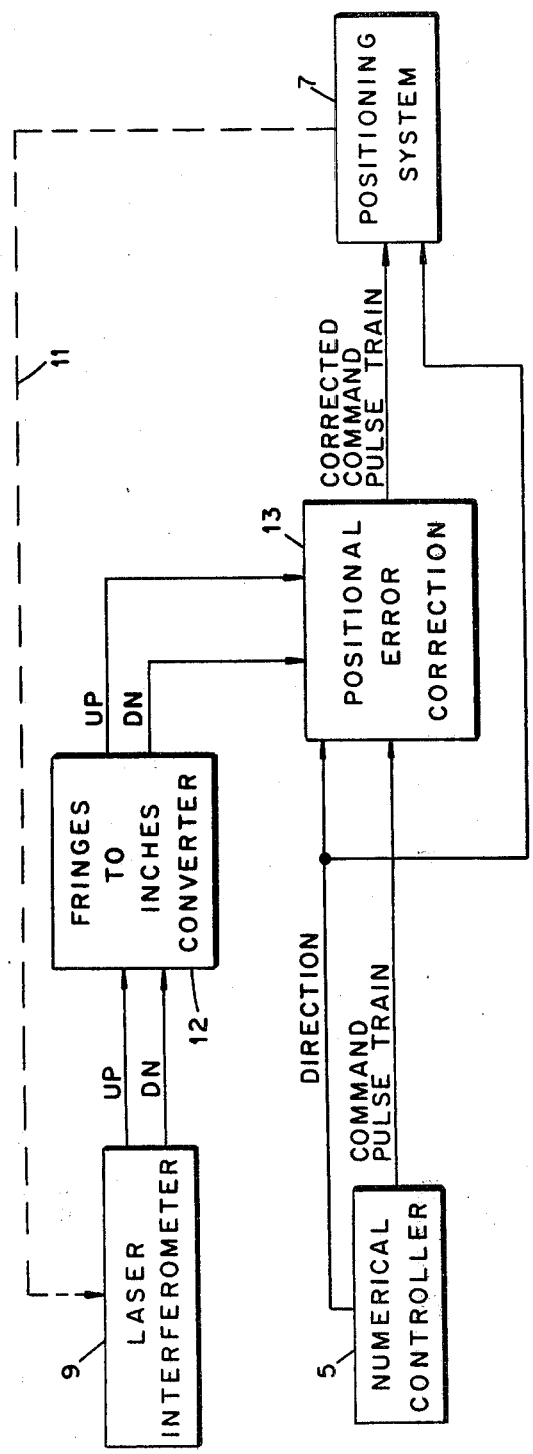
FIG. 1 is a block diagram of a numerical controlled positioning system incorporating the positional error correction system according to the present invention.

Referring now to FIG. 1, there is shown a block diagram of an improved numerical controlled positioning system according to this invention. As will be obvious to those skilled in the art this system may be used with any type of numerical controlled system which generates command pulses for positioning a device, such as a machine tool along a particular axis, together with a direction indicating output line. In the particular system shown here the numerical controller 5 generates command pulses at an output in which each pulse represents 1 microinch displacement along the particular axis that the machine tool is to be moved by the positioning system including a drive means. Although the system is illustrated here for a very basic single axis system, it will be obvious that the system may be expanded for use in machines with two or more axes of movement for positioning an article such as a machine tool along a prescribed path.

A conventional laser interferometer feedback system 9 is used coupled via an optical system represented by the dashed line 11 to monitor the movement of the tool positioned by the system 7. The laser interferometer 9 generates pulses on separate lines depending upon the direction of movement sensed by the interferometer. For example, if the tool is moving in the forward direction pulses on the up line output of the interferometer would indicate the movement in the forward direction. Due to vibration or various other errors in the positioning system the interferometer will also produce pulses indicating the reverse movement which are presented on the down line output of the interferometer 9. These pulses each represent a fringe distance of displacement which is a function of the wave length of the particular laser light source employed in the interferometer. These pulses are converted to pulses representing the same increment of movement (1 M inch) as the command pulses from the numerical controller 5 by means of a conventional fringes-to-inches converter 12. These pulses are maintained on the up and down lines at the output of the fringes-to-inches converter and are presented to separate inputs of the positional error correction circuit 13, which is the subject of this invention.

Figure 2:
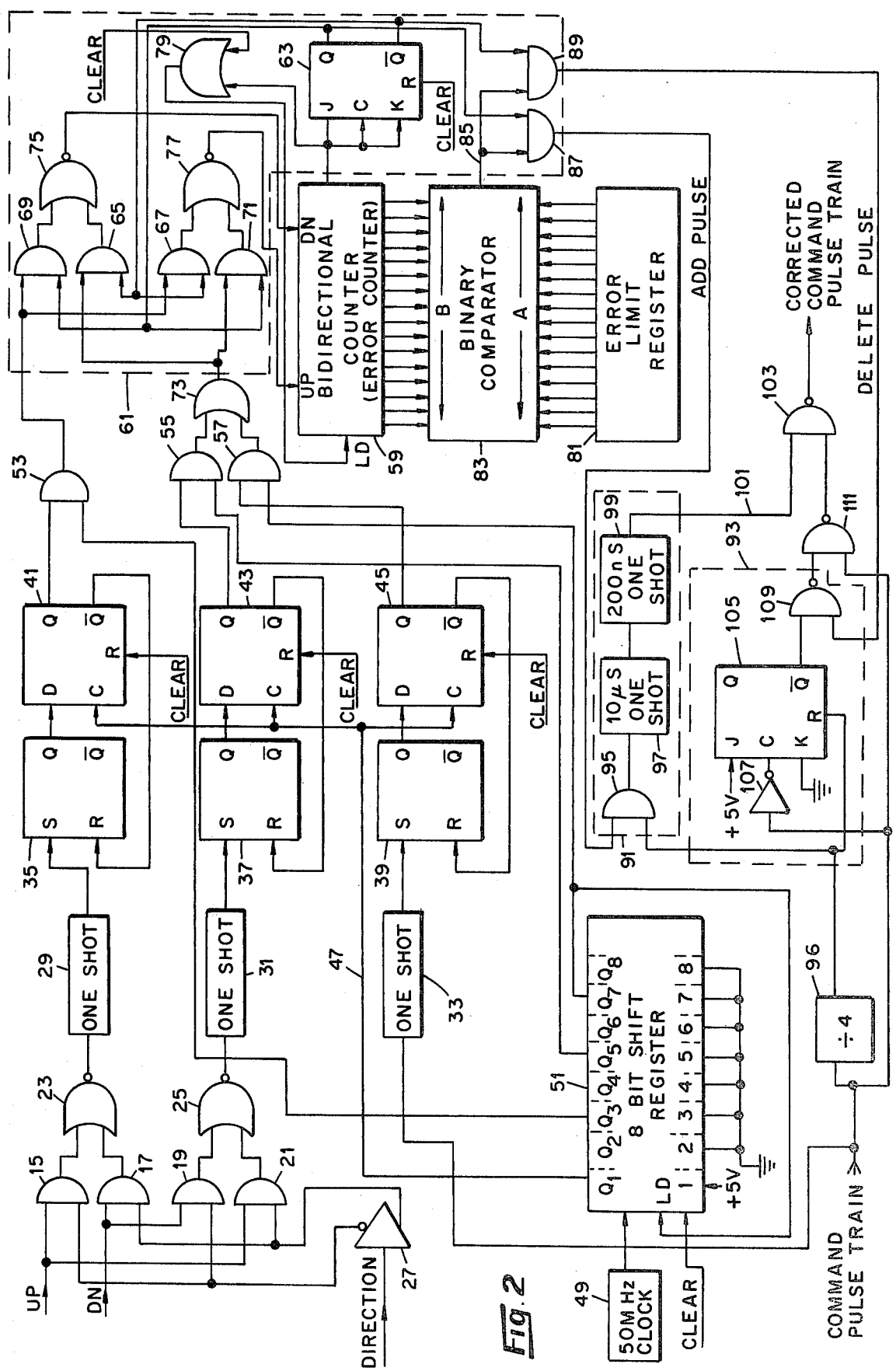
FIG. 2 is a logic diagram of the positional error correction system shown in block form in FIG. 1.

As shown in FIG. 1 the command pulses from the numerical controller and the direction indication line are connected to separate inputs of the positional error correction circuit 13 and the output of the circuit is connected to the positioning system 7. The positional error correction circuit corrects the command pulse train if the error between the commanded position the tool is to be moved and the error sensed by the interferometer feedback system 9 becomes greater than some preselected limit monitored by the positional error correction circuit system 13, as will now be described with reference to FIG. 2.

The up and down pulses from the fringes-to-inches converter 12 are supplied to a direction gating control circuit including gates 15–25. The up signal line is connected to one input of an AND gate 15 and to one input of an AND gate 21. The down line is connected to one input of an AND gate 17 and an AND gate 19. The direction control line from numerical controller 5 which is either in the logic one or logic zero state depending upon direction of commanded movement of the tool is connected to the input of a high speed complementary output gate 27 which has an inverting output connected to the second inputs of gates 15 and 19 and a non-inverting output connected to the second inputs of gates 17 and 21. Assuming the up count line from the fringes-to-inches converter 12 indicates movement in the forward direction, the direction line from the numerical controller 5 is in a logic zero state which applies a logic one by means of gate 27 to enable gates 15 and 19, thus the up direction pulses pass through gate 15 and the down line, or reverse direction pulses, pass through gate 19. If the slide is directed to move in the opposite direction gates 17 and 21 are enabled and thus the down line pulses would be directed through gate 17 while the up pulses would be directed through gate 21. The outputs of gates 15 and 17 are connected through a NOR gate 23 to the input of a one-shot 29. The outputs of gates 19 and 21 are connected through a NOR gate 25 to the input of a one-shot 31.

The command pulse line from the numerical controller is connected to the input of a one-shot 33. The pulse information from both the interferometer and the numerical controller is temporarily stored in a latching circuit arrangement formed by RS flip-flops 35 through 39 in conjunction with D-type flip-flops 41 through 45. The output of one-shot 29 is connected to the set (S) input of flip-flop 35. Similarly, the outputs of one-shots 31 and 33 are connected to the S inputs respectively of flip-flops 37 and 39. The set Q outputs of flip-flops 35–39 are connected respectively to the D inputs of corresponding flip-flops 41–45. The reset output ($\overline{Q}$) of each of the D-type flip-flops 41–45 is connected to its corresponding RS flip-flop (35–39) reset input. The direct reset inputs R of the D-type flip-flops 41–45 are connected to a clear line which is activated prior to operation of the circuit to insure that both sets of flip-flops are initially in the reset condition. The pulse information is clocked into the D-type flip-flops 41–45 by means of a clock line 47 connected to the clock input (C) of flip-flops 41–45.

Timing for the transfer of the information through the circuit is controlled by a 50 MHz clock 49 which has an output connected to the clock input of an 8 bit shift register 51. The bit position one is connected to a logic one voltage, +5 volts, at its input while the remainder of the inputs 2–8 are connected to logic zero voltage or ground potential. The clear line is connected to a preset input of the shift register 51 which initially loads the 1 in the first bit position and this bit is shifted through the register by the clock 49 at a 50 MHz rate. The bit 7 output $Q_7$ is connected to the load input of the shift register which reloads the logic one in the first bit position, thereby recirculating the bit through the register at the clock rate. The $Q_1$ output provides the clock line 47 to the clock inputs of flipflops 41–45. Thus the first operation of the timing sequence is to clock the pulse information from the interferometer and the numerical controller into the latching circuitry and then serially sample the latches to transfer the pulse data into the counter circuitry.

The Q output of flip-flop 41 is connected to one input of an AND gate 53. The second input of AND gate 53 is connected to the third bit output ($Q_3$) of the shift register 51. Thus, if a forward direction pulse is sensed by the interferometer and clocked into the flip-flop 41, the Q output of flip-flop 41 is high, causing the output of gate 53 to be high during the time the bit 3 output $Q_3$ of the shift register 51 goes high. Similarly the Q outputs of flip-flops 43 and 45 are connected respectively to separate inputs of a pair of AND gates 55 and 57. The second input of gate 55 is connected to the $Q_5$ output of shift register 51 and the second input of gate 57 is connected to the $Q_7$ output of the shift register 51. Thus each of the three stages of the latching circuit is sampled in sequence by the outputs of the shift register to allow the transfer of the pulses to the proper inputs of a bidirectional counter 59.

To properly direct the pulses into the counter, depending upon whether the error is a lagging error or a leading error—i.e. the tool position is lagging the commanded position or leading the commanded position—an error direction control circuit, enclosed by dash-lines 61, is provided. The control element of the circuit is a JK flip-flop 63. The J, C and K inputs of flip-flop 63 are connected to the borrow output of the last stage of the bidirectional counter 59. The direct reset input of flip-flop 63 is connected to the clear line. The reset output $\overline{Q}$ is connected to one input of an AND gate 65 and one input of an AND gate 67. The set Q output flip-flop 63 is connected to one input of gate 69 and one input of gate 71. AND gates 55 and 57 are connected to one input of gate 65 and one input of gate 71 through separate inputs of an OR gate 73. The outputs of gates 65 and 69 are connected through separate inputs of a NOR gate 75 to the down count input of counter 59. The outputs of gates 67 and 71 are connected through separate inputs of a NOR gate 77 to the up count input of counter 59. In the initial condition flip-flop 63 is reset ($\overline{Q}$ high) and the command pulse train is gated through gates 57, 73, 65 and 75 to the down count input of counter 59. The up counts from the interferometer are gated through gate 53, gate 67 and gate 77 to the up count input of counter 59. Assuming that a vibration or other errors cause a down count pulse to be applied by the interferometer to the circuit, this pulse is gated through gate 55, gate 73, gate 65 and gate 75 to the down count input of counter 59.

The error count registered by the bidirectional counter 59 is an absolute value independent of whether the error is a lagging error or a leading error. The JK flip-flop 63 is clocked or complemented each time a borrow signal is generated indicating that the bidirectional counter is counting through zero. Thus assuming that the tool position will lag the commanded position as soon as the first command pulse is clocked through to the down count input of the bidirectional counter 59, the counter will output a borrow signal to flip-flop 63 causing it to complement and the pulses to the up and down input of the counter 59 will be reversed from that of the initial condition as described above. In addition the borrow signal output of counter 59 is connected to one input of an OR gate 79 which has a second input connected to the clear line. The output of OR gate 79 is connected to the load input of counter 59 which clears the counter and loads the binary one count in the counter.

Once flip-flop 63 is set (Q output high) from the initial cleared condition, the command pulses from the numerical controller are applied through gate 71 to the up count input of the counter while the up, or forward direction pulses from the interferometer are gated through gate 69 to the down count input of the counter. The error count registered by the counter 59 is compared bit by bit with a preselected error limit value set in a register 81 including selector switches 81 for setting a binary value in the register. The error limit value is selected by an operator which is typically in the range of from 1 to 10 counts. At 1 microinch per count, this represents an error limit of from 1 to 10 microinches. The limit is compared with the registered error count in counter 59 by means of a binary comparator 83. The counter bits are connected to the B inputs of the binary comparator while the error limit value is connected to the A input of the comparator 83. As long as the error count at the B inputs does not exceed the error limit value at the A inputs of binary comparator 83 pulses are neither added to nor deleted from the command pulse train. However, if the B value exceeds the A value, the output of the comparator 83 at line 85 will be switched from a logic zero to a logic one level which triggers a pulse train correction operation.

In order to determine whether the comparator output is an instruction to add-a-pulse or delete-a-pulse from the pulse train, a pair of AND gates 87 and 89 are provided which form a part of the error direction control circuit 61. These gates determine whether a pulse is to be added to or subtracted from the command pulse train when the output of the binary comparator 83 goes high. Thus the output of the comparator 83 is connected to one input each of AND gates 87 and 89. The Q output of flip-flop 63 is connected to the second input of AND gate 87 and the $\overline{Q}$ output of flip-flop 63 is connected to the second input of the AND gate 89. Thus, when the tool position is lagging the commanded position, the Q output of flip-flip 63 is high enabling gate 87 whose output is connected to an add pulse control line. When the tool position is in error by leading the position indicated by the command pulses, the $\overline{Q}$ output of flip-flop 63 is high enabling gate 89 to pass the output of the binary comparator 83 to the delete pulse line. Thus, the output of gate 87 is connected to the input of an add-a-pulse circuit 91 while the output of gate 89 is connected to an input of a delete-a-pulse circuit 93.

The add-a-pulse circuit 91 includes an AND gate 95 having one input connected to the output of gate 87 and a second input connected to the output of a divide-by-4 counter 96. The input of counter 96 is connected to receive the command pulse train from the numerical controller. The output of gate 95 is connected to the input of a 10 microsecoond one-shot 97. The output of one-shot 97 is connected to the input of a 200 nanosecond one-shot which generates a negative going pulse having the same width as the command pulses on an output line 101. Output line 101 is connected to one input of a NAND gate 103.

The delete-a-pulse circuit 93 includes a JK flip-flop 105 which has its J input connected to a logic one voltage level (+5 volts) and its K input connected to a logic zero voltage (ground voltage). The clock input (C) is connected through an invertor 107 to the command pulse train line from the numerical controller. The direct reset (R) input of flip-flop 105 is connected to the output of the divide-by-4 counter 96. The $\overline{Q}$ output of flip-flop 105 is connected to one input of a NAND gate 109 which has its second input connected to the output of AND gate 89, the delete pulse line. The output of NAND gate 109 is connected to one input of a NAND gate 111 which has its second input connected to the command pulse line. The output of NAND gate 111 is connected to a separate input of gate 103. The output of gate 103 forms the corrected command pulse train line which is connected to the positioning system 7, as shown in FIG. 1.

In operation the command pulses from the numerical controller are applied through the error correction circuit by passing through gate 111 and gate 103. The first command pulse operates through invertor 107 to set flip-flop 105 of the delete-a-pulse circuit 93. Flip-flop 105 is not returned to the reset condition to enable gate 109 until a pulse is available at the output of the divider 96. This means that in order to make a correction in the pulse train the command pulses must be present. This prevents oscillation of the system during a correction operation. Further, neither the add-a-pulse circuit 91 nor the delete-a-pulse circuit 93 is enabled until the divider 96 goes high at the end of the count of four command pulses. Thus the rate at which the correction is made may be changed by changing the division factor of counter 96. Corrections are only made at four command pulse intervals, in this example.

Each pulse from the pulse train is a positive going pulse 200 nanoseconds in duration. Thus, when a pulse is added both lines of gate 95 must be high triggering the 10 microsecond one-shot 97 and at the end of this period a 200 nanosecond pulse is produced by one-shot 99. This pulse is a negative going pulse causing the output of gate 103 to go high for 200 nanoseconds thereby adding a command pulse to the train.

To delete-a-pulse the delete pulse line to gate 109 goes high and as soon as the divide-by-4 counter 96 goes high, resetting flip-flop 105, the output of gate 109 goes low, thereby disabling gate 111 from passing a command pulse. Only one command pulse can be deleted at any one time because the negative going edge of the command pulse that has been deleted sets flip-flop 105 and it is not reset until the divide-by-4 counter 96 counts through another sequence. It will be obvious that counter 96 may be selected for various division factors, depending upon the degree of smoothness desired in moving the tool during a correction operation.

The clock rate of the clock 49 is selected so that the pulses may be registered and clocked through to the counter 59 in the manner as described above without losing either command pulses or interferometer feedback pulses. The temporary storage in the latching arrangement of the flip-flops 35–45 further operate to prevent loss of pulses during the counting period. For example, assuming an up pulse is gated through gate 15, gate 23 to trigger one-shot 29, the output of one-shot 29 goes low setting flip-flop 35. This causes the Q output of flip-flop 35 to go high which is applied to the D input of flip-flop 41. As soon as the clock pulse from the $Q_1$ output of register 51 is applied to the clock input of the D-type flip-flop 41 the Q output goes high and the $\overline{Q}$ output goes low. This resets flip-flop 35 by connecting the $\overline{Q}$ output to the reset input thereof. This enables flip-flop 35 to be set by another pulse from one-shot 29. Similarly, the down pulses and the command pulses are temporarily stored and latched in the same manner and clocked through into the counter by means of the 8-bit shift register 51 as described above.

The D-type flip-flop operates by transferring the logic level of the D input to the Q output when the clock pulse is applied to the clock input thereof. The pulses latched in the D-type flip-flops 41–45 are sampled consecutively at gates 53, 55 and 57 and gated through the error count direction circuit 61 input gating to either count the bidirectional counter 59 up or down depending upon the direction of the error presently being monitored. When the error count exceeds the error limit as selected at the register 81, the output line 85 of the binary comparator 83 goes high. Depending upon whether the error is a leading error or a lagging error, as monitored by flip-flop 63, either gate 89 or 87 will be enabled by flip-flop 63 to correct the pulse train. The pulse train is corrected by either deleting or adding pulses thereto until the error count is reduced to a value below the error limit causing the output line 85 of the binary comparator 83 to go low again.

Thus it will be seen that a major advantage of the present invention is that the error measured by the laser interferometer is much smaller than the error measured by a conventional positioning system in which the tool is moved by the error signal itself. This means that the system may operate using lower gains and, therefore, react to smaller cyclic errors without oscillating. This feature is extremely important in the production of ultra-high precision machined surfaces, since cycle errors from irregular lead screws and gears is inherent in conventional tool positioning mechanisms of conventional NC machines.

Although the system has been illustrated by means of a specific example applied to a single axis of movement, it will be obvious to those skilled in the art that NC machines of varying number of axes of movement may employ the improvement. A separate positional error correctional system as described above would be used with each axis of the machine. It will further be obvious to those skilled in the art that various modifications and changes may be made in the illustrated invention without departing from the spirit and scope of the invention as set forth in the following claims attached to and forming a part of this specification.

What is claimed is:

1. In combination with a numerically controlled machine including a numerical controller for generating command pulses at an output and a direction control signal at a separate output and applying said command pulses to an input of a positioning system to position an article along an axis in a forward or reverse direction as indicated by said direction control signal, and an interferometer feedback system for monitoring the movement of said article and generating pulses on an up pulse line when movement is sensed in said forward direction and generating pulses on a down pulse line when movement is sensed in the reverse direction, a positioning error correction circuit comprising:

a bidirectional error counter having an up count input, a down count input and a zero count output which is activated each time said counter is counted down through zero count;

an error count limit selector means for selecting and registering an error count limit value corresponding to an absolute error limit magnitude;

a comparator means for comparing said error count registered by said counter with said error count limit value registered by said selector means and generating a correction signal at an output thereof when said error count exceeds said error count limit value;

input circuit means responsive to said direction control signal from said controller for gating said up and down pulses from said interferometer feedback system and said command pulses from said controller to first and second outputs of said input circuit means so that the difference in the number of pulses appearing at said first and second outputs of said input circuit means represents the positioning error of said system;

an error direction sensing and control means responsive to said zero count output of said counter for directing pulses from said first and second outputs of said input circuit means to said up and down count inputs of said counter so that an absolute error count is registered by said counter and further responsive to the output of said comparator for generating a first error correction signal at a first output thereof when said error is a lagging error and generating a second error correction signal at a second output thereof when said error is a leading error;

an add-a-pulse circuit means responsive to said first error correction signal for adding command pulses to said input of said positioning system until said lagging error is less than said error limit; and a delete-a-pulse circuit means responsive to said second error correction signal for deleting command pulses from the input of said positioning system until said leading error is less than said error limit.

2. The combination as set forth in claim 1 wherein said input circuit means includes input gating means responsive to said numerical controller for gating said up and down pulses from said interferometer to first and second pulse lines, respectively, when said direction control signal indicates a forward direction command and gating said up and down pulses from said interferometer to said second and first pulse lines, respectively, when said direction control signal indicates a reverse direction command, first, second, and third latching circuit means for temporarily storing pulses applied to respective inputs thereof, said first latching circuit means input connected to said first pulse line of said gating means, said second latching circuit means input connected to said second pulse line of said gating means and said third latching circuit means input connected to said command pulse output of said controller;

sampling circuit means for repeatedly sequentially sampling said first, second and third latching circuit means and transferring said temporarily stored pulses in said first latching circuit means to said first output of said input circuit means, and transferring said temporarily stored pulses in said second and third latching circuit means in order to said second output of said input circuit means.

3. The combination as set forth in claim 2 wherein said counter is a bidirectional binary counter, said error limit selector means includes a binary register and said comparator means is a binary comparator having a first set of binary inputs connected to corresponding binary stages of said binary register of said error count limit selector means and a second set of binary inputs connected to corresponding binary stages of said counter.

4. The combination as set forth in claim 3 wherein said add-a-pulse circuit means and said delete-a-pulse circuit means further includes means responsive to the repetition rate of said command pulses from said controller for limiting the addition or deletion of command pulses to said positioning system by said add-a-pulse circuit means and said delete-a-pulse circuit means so that a positioning error correction is made during a selected length of movement of said article.

* * * * *